US012586085B2

(12) United States Patent
Paskalov

(10) Patent No.: US 12,586,085 B2
(45) Date of Patent: Mar. 24, 2026

(54) METHOD FOR DETERMINING AUTHENTICITY OF HANGING IMAGES AND DEFORMATION ANALYSIS OF AUTHENTICITY OF ITEM BASED ON AUTHENTICATION SCORE TRANSGRESSING AUTHENTICITY THRESHOLD

(71) Applicant: eBay Inc., San Jose, CA (US)

(72) Inventor: Dmitry Paskalov, Cliffside Park, NJ (US)

(73) Assignee: EBAY INC., San Jose, CA (US)

( * ) Notice: Subject to any disclaimer, the term of this patent is extended or adjusted under 35 U.S.C. 154(b) by 142 days.

(21) Appl. No.: 18/217,998

(22) Filed: Jul. 3, 2023

(65) Prior Publication Data

US 2025/0014051 A1     Jan. 9, 2025

(51) Int. Cl.
G06Q 30/018          (2023.01)
G06V 10/74           (2022.01)
(Continued)

(52) U.S. Cl.
CPC ......... G06Q 30/0185 (2013.01); G06V 10/74 (2022.01); G06V 20/95 (2022.01); G06T 7/0002 (2013.01)

(58) Field of Classification Search
None
See application file for complete search history.

(56) References Cited

U.S. PATENT DOCUMENTS 8,908,920 B2    12/2014  Wood et al.
10,127,589 B2   11/2018  Nair
(Continued)

FOREIGN PATENT DOCUMENTS

CN        110060067        7/2019
CN        107463962        6/2020
(Continued)

OTHER PUBLICATIONS

"eBay Launches Authentication for Luxury Handbags", [Online]. Retrieved from the Internet https www.ebayinc.com stories news ebay-launches-authentication-for-luxury-handbags , Jun. 2021, 6 pgs.
(Continued)

*Primary Examiner* — Haris Sabah
(74) *Attorney, Agent, or Firm* — SCHWEGMAN LUNDBERG & WOESSNER, P.A.

(57)                    ABSTRACT

Systems and methods are directed to authenticating items using deformation analysis. An authentication system receives a request to authenticate an item. In response, the authentication system accesses two images of the item, whereby a first image shows the item hanging without a weight load and a second image shows the item hanging with the weight load. An image analyzer analyzes the two images to determine deformation differences of the item between the two images. The authentication system then determines an authentication score for the item by applying the deformation differences to a machine learning model trained with training data derived from authentic and counterfeit items. Based on the authentication score transgressing an authenticity threshold, an indication of authenticity of the item is provided.

20 Claims, 7 Drawing Sheets

(51) Int. Cl.
    *G06V 20/00*        (2022.01)
    *G06T 7/00*           (2017.01)

(56)          References Cited

U.S. PATENT DOCUMENTS

| | | | |
|---|---|---|---|
| 11,501,320 | B2 | 11/2022 | Hemminger et al. |
| 11,720,907 | B2 * | 8/2023 | Chen .................. G06Q 30/0185 |
| | | | 705/26.61 |
| 2006/0261157 | A1 * | 11/2006 | Ostrowski ........... G07G 1/0054 |
| | | | 235/383 |
| 2008/0073007 | A1 | 3/2008 | Zuesi-Kreuzer |
| 2014/0279613 | A1 * | 9/2014 | Lee .................... G06Q 30/0185 |
| | | | 705/318 |
| 2017/0161810 | A1 * | 6/2017 | Nair .................... G06F 16/5854 |
| 2018/0108024 | A1 * | 4/2018 | Greco ................ G06K 7/10366 |
| 2018/0367682 | A1 * | 12/2018 | Pingeot ................ H04N 1/0019 |
| 2020/0143528 | A1 * | 5/2020 | Kulkarni ................ G06V 20/69 |
| 2021/0117984 | A1 * | 4/2021 | Sharma .................... G07D 7/20 |
| 2021/0192340 | A1 | 6/2021 | Stonehouse et al. |
| 2021/0224563 | A1 * | 7/2021 | Patel .................... G06F 18/214 |
| 2023/0368216 | A1 * | 11/2023 | Hagen ................ G06Q 30/0185 |

FOREIGN PATENT DOCUMENTS

| | | |
|---|---|---|
| FR | 3108481 | 10/2021 |
| WO | 2018190778 | 10/2018 |

OTHER PUBLICATIONS

"Handbag Authentication", [Online]. Retrieved from the Internet https www.handbagclinic.co.uk authenticate, 5 pgs.

* cited by examiner

METHOD FOR DETERMINING AUTHENTICITY OF HANGING IMAGES AND DEFORMATION ANALYSIS OF AUTHENTICITY OF ITEM BASED ON AUTHENTICATION SCORE TRANSGRESSING AUTHENTICITY THRESHOLD

TECHNICAL FIELD

The subject matter disclosed herein generally relates to authenticating items. Specifically, the present disclosure addresses systems and methods that determines an authenticity of an item based on mechanical strain and deformation analysis.

BACKGROUND

Sellers typically are hesitant to sell luxury items if they are not certain that they will receive the same item back in case of a return and not a fake version of the item. Similarly, buyers are hesitant to purchase luxury items if they are not certain the items are authentic. This level of trust is extremely important for categories such as designer handbags and accessories. These types of luxury goods are frequently forged to a level that only an expert may be able to authenticate them.

DETAILED DESCRIPTION

Figure 1:
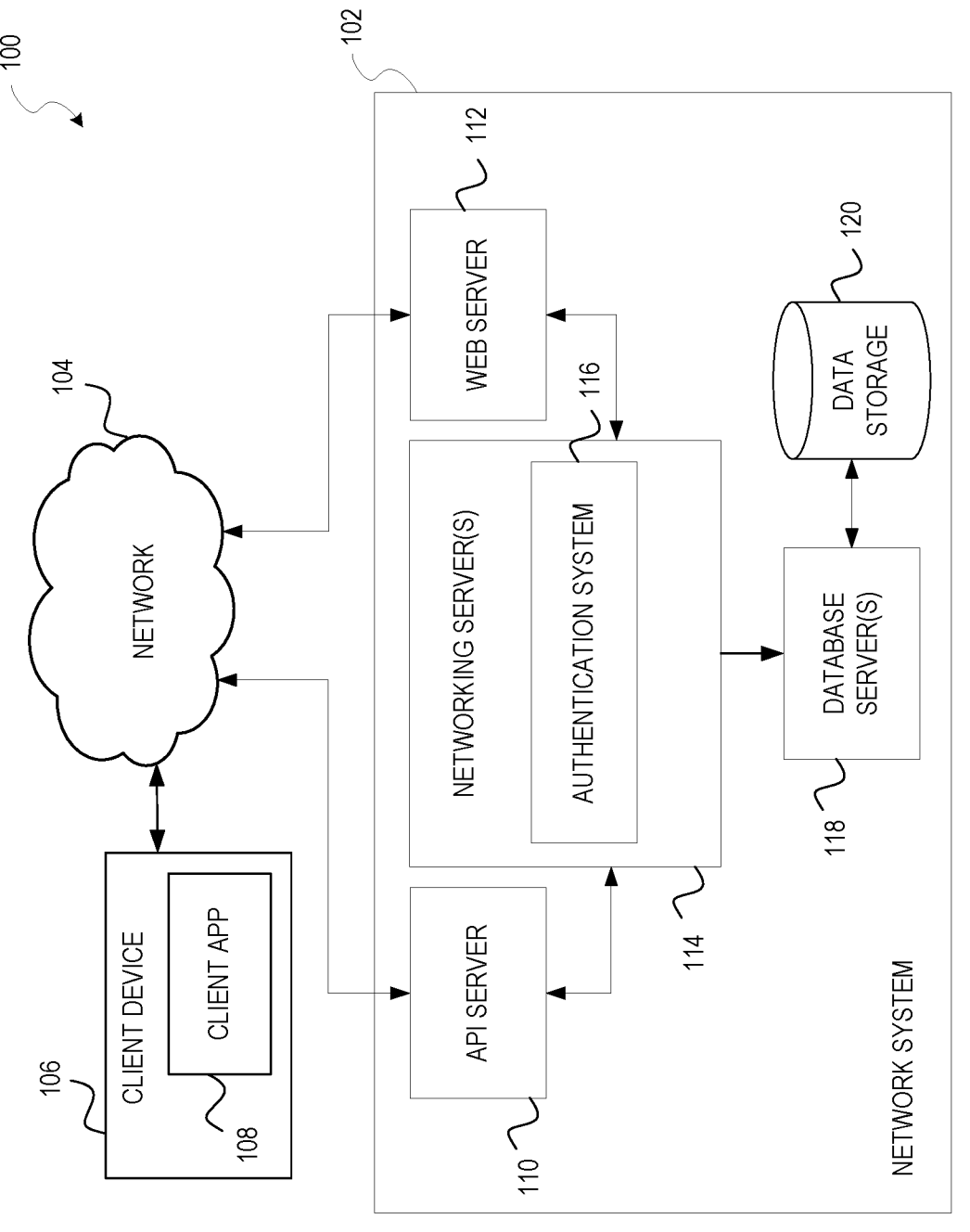
FIG. 1 is a diagram illustrating an example network environment suitable for authenticating an item based on mechanical strain and deformation analysis, according to example embodiments.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

Example embodiments address the technical problem of authenticating items in a computationally efficient manner based on material strain and deformation analysis. When producing a fake luxury item, such as a handbag, a counterfeiter tries to make the fake luxury item look like the authentic item. However, materials that are used, typically, are not the same, especially if the material is on the inside of the item. Thus, example embodiments test the materials that an item is made of in order to identify whether the item is authentic or fake.

In an embodiment where the test item is a handbag, the materials are analyzed based on deformation. Different materials have different deformation (e.g., elastic and plastic) properties. Typically, forged handbags use inferior materials having considerably different mechanical properties. To test the handbag, the handbag is hung from a standard hanging apparatus, such as a doorknob or hook, empty. A first image of the handbag is then captured showing a natural deformation of the handbag. A standard weighted item (e.g., having known dimensions and weight) is then placed into the handbag which will cause the handbag to deform under the weight. For instance, the standard weighted item can be a can of soda. A second image of the handbag is then captured showing the weighted deformation. For example, a handle of the handbag may show more strain and/or a bottom of the handbag may sag more.

The two captured images are then analyzed by an image analyzer to determine deformation differences between the two images. Using the deformation differences, authentication of the item can be determined using either a statistical model or a machine learning model. For the statistical model, the deformation differences are compared to a database of known deformation differences for an authentic version of the item being tested and a determination made whether the comparison is within an authenticity threshold. For the machine learning model, a vector of the deformation differences is generated and applied to the machine learning model. A probability is outputted from the machine learning model and compared to a probability threshold. If the authenticity (probability) threshold is satisfied, then the test item is labeled as authentic.

FIG. 1 is a diagram illustrating an example network environment 100 suitable for authenticating an item based on mechanical strain and deformation analysis, according to example embodiments. A network system 102 provides server-side functionality via a communication network 104 (e.g., the Internet, wireless network, cellular network, or a Wide Area Network (WAN)) to a client device 106. The network system 102 is configured to authenticate items using either a statistical model or a machine learning model, as will be discussed in more detail below.

In various cases, the client device 106 is a device associated with a user account of a user of the network system 102 that wants to make sure that an item they are in possession of is authentic. For example, the user may be a seller that wants to verify that a returned item is the same authentic item that was sold. In other cases, the client device 106 is a device associated with a user account of a buyer of the network system 102 that wants to ensure that an item that they purchased is authentic.

The client device 106 comprises one or more client applications 108 that communicate with the network system 102 for added functionality. For example, the client application 108 may be a local version of an application or component of the network system 102. Alternatively, the client application 108 exchanges data with one or more corresponding components/applications at the network system 102. The client application 108 may be provided by the network system 102 and/or downloaded to the client device 106.

In one embodiment, the client application 108 comprises an authentication component that exchanges data with the network system 102. The client application 108 works with or triggers a camera component or application operating on or associated with the client device 106 to capture images of an item to be authenticated (also referred to herein as the "test item") and transmits the images to the network system 102 for analysis. In return, the client application 108 receives an indication of whether the item is authentic.

The client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The client device 106 may comprise, but is not limited to, a smartphone, tablet, laptop, multi-processor systems, microprocessor-based or programmable consumer electronics, game consoles, set-top boxes, a server, or any other communication device that can access the network system 102. The client device 106 may comprise a display module (not shown) to display information (e.g., in the form of user interfaces) including the indication of whether an item is authentic. The client device 106 can be operated by a human user and/or a machine user.

Turning specifically to the network system 102, an application programing interface (API) server 110 and a web server 112 are coupled to, and provide programmatic and web interfaces respectively to, one or more networking servers 114. The networking server(s) 114 host various systems including an authentication system 116, which comprises a plurality of components and which can be embodied as hardware, software, firmware, or any combination thereof. The authentication system 116 will be discussed in more detail in connection with FIG. 2.

The networking server(s) 114 are, in turn, coupled to one or more database servers 118 that facilitate access to one or more storage repositories or data storage 120. The data storage 120 is a storage device storing, for example, user accounts (e.g., profiles associated with a buyer or seller).

Any of the systems, servers, data storage, or devices (collectively referred to as "components") shown in, or associated with, FIG. 1 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one system may, in alternative examples, be embodied in a different system. For example, any number of client devices 106 or data storage 120 may be embodied within the network environment 100. While only a single network system 102 is shown, alternatively, more than one network system 102 can be included (e.g., localized to a particular region).

Figure 2:
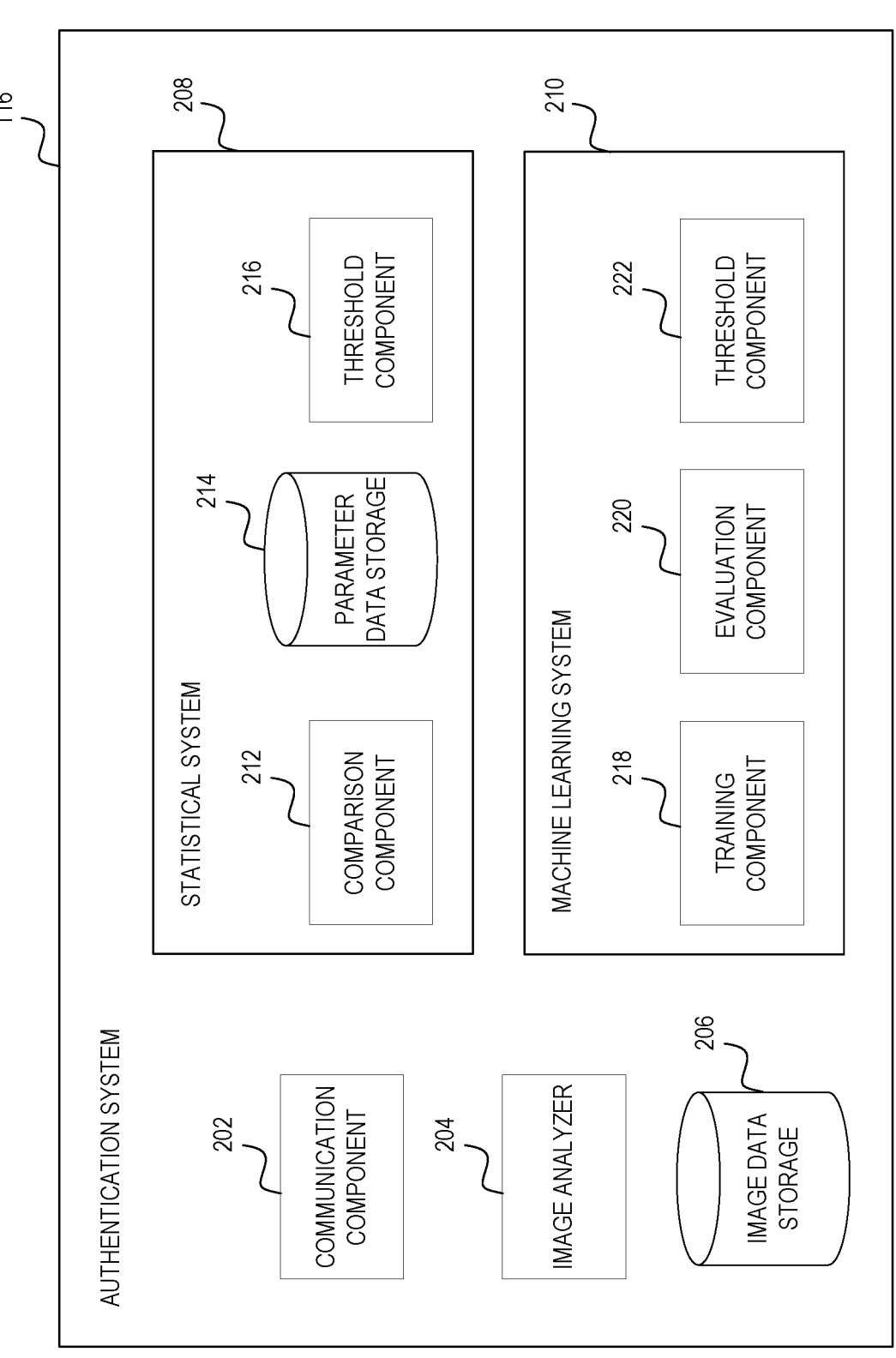
FIG. 2 is a diagram illustrating components of an authentication system that authenticates items based on deformation analysis, according to example embodiments.

FIG. 2 is a diagram illustrating components of the authentication system 116 that authenticates items based on mechanical strain and deformation analysis, according to example embodiments. The authentication system 116 accesses two images of a test item, determines deformation differences between the two items, and applies the deformation differences to a statistical model or a machine learning model. Based on a result of the statistical model or the machine learning model, a determination is made whether the test item is authentic (e.g., satisfies an authenticity threshold). To enable these operations, the authentication system 116 comprises a communication component 202, an image analyzer 204, an image data storage 206, a statistical system 208, and a machine learning system 210 all configured in communication with one another (e.g., via a bus, shared memory, or a switch). In some embodiments, the authentication system 116 may comprise the statistical system 208 and not the machine learning system 210 or comprise the machine learning system 210 and not the statistical system 208.

The communication component 202 is configured to exchange data with other components of the network environment 100. Thus, the communication component 202 receives, from the client application 108 operating on the client device 106, a request to authenticate an item. In some cases, the request includes at least two images of the item to be authenticated. In other cases, the request indicates at least two images to retrieve (e.g., uploaded to a data storage) for analysis. After analysis by the authentication system 116, the communication component 202 transmits a response to the query that includes an indication of the authenticity of the item.

The image analyzer 204 is configured to analyze the two images of the test item. In some cases, the image analyzer 204 extracts features of the item to identify a brand and/or model of the item. For instance, the item may have a particular logo, pattern, color scheme, and/or shape that are distinct characteristics of a particular brand/model of the item. As an example, a Louis Vuitton Neverfull in Monogram canvas will have the distinctive LV pattern in a brown and mustard color and have a tote bag shape. The image analyzer 204 can extract features such as, for example, a name (e.g., logo), size, type of item (e.g., tote bag versus a bucket bag), and/or colors from one or both images. The image analyzer 204 then accesses the image data store 206 to identify the item based on the extracted features. The image data store 206 comprises a database of features associated with different brands and models. The image analyzer 204 looks for a match in the image data storage 206 for the extracted features.

In other cases, the request to authenticate the item can include features that are used by the image analyzer 204 to identify and authenticate the item. For example, the request can include a brand, model name, serial number, data of purchase or manufacture, and/or weight of the item. The image analyzer 204 can use one or more of these features to look up the item in the image data storage 206.

The image analyzer 204 also compares the two images to determine the deformation differences between the two images. For instance, the first image of a handbag will show the handle and bottom of the bag with a natural deformation, while the second image will show the handle and bottom of the bag strained based on the addition of an item with a known shape and weight such as a standard can of soda. The image analyzer 204 selects various locations along the handle and/or the bottom of the bag and determines the difference in deformation at these various locations (e.g., a distance that the material deformed at the various locations). For example, the various locations along the handle can be a center location of the handle, two end locations (e.g., where the handle is attached to a body of the handbag), and/or locations between the end locations and the center location equally spaced by a predetermined length. Similarly, the various locations along the bottom can be a center location of the bottom, two end locations (e.g., where bottom is attached to a side of the body of the handbag), and/or locations between the end locations and the center location equally spaced by a predetermined length.

In embodiments that use statistical analysis, the deformation differences determined by the image analyzer 204 at the various locations along the handle and/or body are provided to the statistical system 208. The statistical system 208 using statistical analysis to determine whether the test item is authentic. Accordingly, the statistical system 206 comprises a comparison component 212, a parameter data storage 214, and a threshold component 216.

The comparison component 212 is configured to compare the deformation differences received from the image analyzer 204 with known deformation parameters for an authentic version of the item. Accordingly, the comparison component 212 accesses a database of known deformation parameters for the authentic version of the item from the parameter data storage 214. The comparison component 212 then compares the deformation differences at the various locations with the database of known deformation parameters. In performing the comparison, the comparison component 212 determines whether each of the deformation differences is within a threshold of the corresponding value in the database (e.g., within 95%).

In some embodiments, the comparison takes into consideration the age of the test item. Because materials change and deform at different rates with usage, the age of the test item can be important. In these embodiments, the parameter data storage 214 will include different deformation differences for a same brand/model for different years.

In some embodiments, the weight of the test item may also be considered by the comparison component 212. Because different materials will have a different weight, a fake item may have a weight that is different from a weight of an authentic item. In these embodiments, a user will weigh the test item without the weight load. The weight of the test item is then provided to the authentication system 116 and used as another parameter for comparison by the comparison component 212. Thus, the comparison component 212 can compare the weight of the test item with a weight of the authentic item accessed from the parameter data storage 214.

The threshold component 216 determines whether the test item is authentic based on an authentication score determined from the comparison performed by the comparison component 212. In example embodiments, the authentication score comprises a percentage of the locations where the deformation difference is within a threshold of the corresponding value in the parameter data storage 214. For example, if the deformation difference at 90% (e.g., an authenticity threshold of 90% or 0.9) of the locations is within the threshold of the corresponding value in the database, the threshold component 216 labels the test item authentic. In some cases, the authenticity threshold (e.g., percent of deformation differences within the threshold) is the same for all types of items for a particular brand or category. In other cases, the authenticity threshold is different based on the brand, model, and/or category. In some cases, the threshold component 216 can be a part of the comparison component 212.

In embodiments that also take the weight of the test item into consideration, the result of the weight comparison (e.g., match within a threshold percentage of the authentic weight) can be a portion of the authentication score (e.g., 10% of the authentication score). In other embodiments, a test item weight that is more than a particular percentage different (e.g., more than 50% difference in weight) from the authentic item weight may automatically cause the threshold component 216 to label the test item as a fake.

In embodiments that use machine learning analysis, the deformation differences determined by the image analyzer 204 at the various locations along the handle and/or body are provided to the machine learning system 210. For example, the deformation differences may be provided as a multidimensional vector (embedding). The machine learning system 210 is configured to train an authentication model and refine the authentication model by retraining with updated training data. During inference or runtime, the machine leaning system 210 uses the trained authentication model to determine a probability that the test item is authentic.

To enable these operations, the machine learning system 210 includes a training component 218, an evaluation component 220, and a threshold component 222 all configured to communicate with each other (e.g., via a bus, shared memory, or a switch). While FIG. 2 shows the training component 218 and the evaluation component 220 being embodied within the machine learning system 210, alternatively, the training component 218 can be separate from the evaluation component 220 in a different system or server.

In example embodiments, the training component 218 trains the authentication models using deformation differences for authentic and counterfeit items as training data. For example, images of each authentic and counterfeit item both with a weight load and without the weight load are captured and deformation differences determined. These deformation differences are then used to train the models. The machine learning can occur using an artificial intelligence such as a trained neural network. For example, the neural network is trained by providing a set of authentic images and a set of images of counterfeit items. Weights can then be adjusted accordingly to receive a desired result. The training of the authentication model may include training for probabilities (e.g., authentication scores) that an item is authentic. For consistency, the weighted item used to provide the weight load for training the models should be the same as the weighted item used when capturing images of the item to be authenticated. For instances, the weighted item can be a can of soda that is placed at a specific location of the handbag such as at the center of the bottom and/or at a predefined pocket of the handbag.

In some cases, additional data is included in the training data to improve accuracy. The additional data can include year of production of the authentic items and where the authentic items were made. This may be determined from a tag (e.g., an image of the tag) attached to the handbag. In some handbags, this data may be extracted using RFID (radio frequency identification) technology. For example, quality and characteristics of materials can change through the years with materials or manufacturing being slightly different between different factories/locations. Additionally, materials deteriorate based on usage/age. As such, the training data can include deformation differences for different ages (e.g., year of manufacture) of a same type/model of authentic items.

Another additional data that is included in the training data are weights of authentic items. As discussed above, different materials will have different weights.

Any number of authentication models can be trained. For instance, a separate model can be trained for each brand and model of authentic items (e.g., Louis Vuitton Neverfull MM) and, in some cases, based on type of material used (e.g., Monogram, Empreinte Leather). Alternatively, the authentication model may be trained for a particular brand (e.g., Louis Vuitton, Gucci, Prada) or category of item (e.g., luxury tote bags, luxury bucket bag).

Over time, the training data may be updated to refine the authentication models. For example, with each passing year, the deformation differences may become greater or change for different authentic items. Additionally, new versions of authentic items are constantly being created (e.g., same model but in a different material, same model and material but manufactured in a different location). The training data may be updated to reflect these changes and the corresponding authentication models retrained.

During runtime or inference time, the evaluation component 220 of the machine learning system 210 is configured to determine a probability that a test item is authentic. In example embodiments, the evaluation component 220 or the image analyzer 204 formats the deformation differences into an input vector. If weight is a parameter, the weight is also included in the input vector. The input vector is then applied to the corresponding authentication model by the evaluation component 220. The authentication model then provides a result that is a probability (or percentage) that the test item is authentic.

In some cases, there are different levels of authentication available for authenticating a handbag. A first level of authentication is based solely on the deformation differences of the handle of the handbag. Alternatively, the first level of authentication can be based solely on the deformation differences of the bottom of the handbag. A second level of authentication can be based on the deformation differences of both the handle and the bottom of the handbag. The second level of authentication can detect, for example, that the handle of the handbag is fake, but the body of the handbag is real (or vice-versa). Weight can be included as part of the first or second authentication level.

The probability outputted by the evaluation component 220 can be compared to an authenticity threshold by the threshold component 222. In some cases, the authenticity threshold is the same for all types of items for a particular brand or category. In other cases, the authenticity threshold is different based on the brand, model, and/or category. For example, the authenticity threshold may be a probability of 0.8 or 80% for luxury tote bags. Thus, a probability of 0.79 outputted by the evaluation component 220 results in the test item being labeled fake or not authentic, while a probability of 0.82 results in the test item being labeled authentic.

Figure 3B:
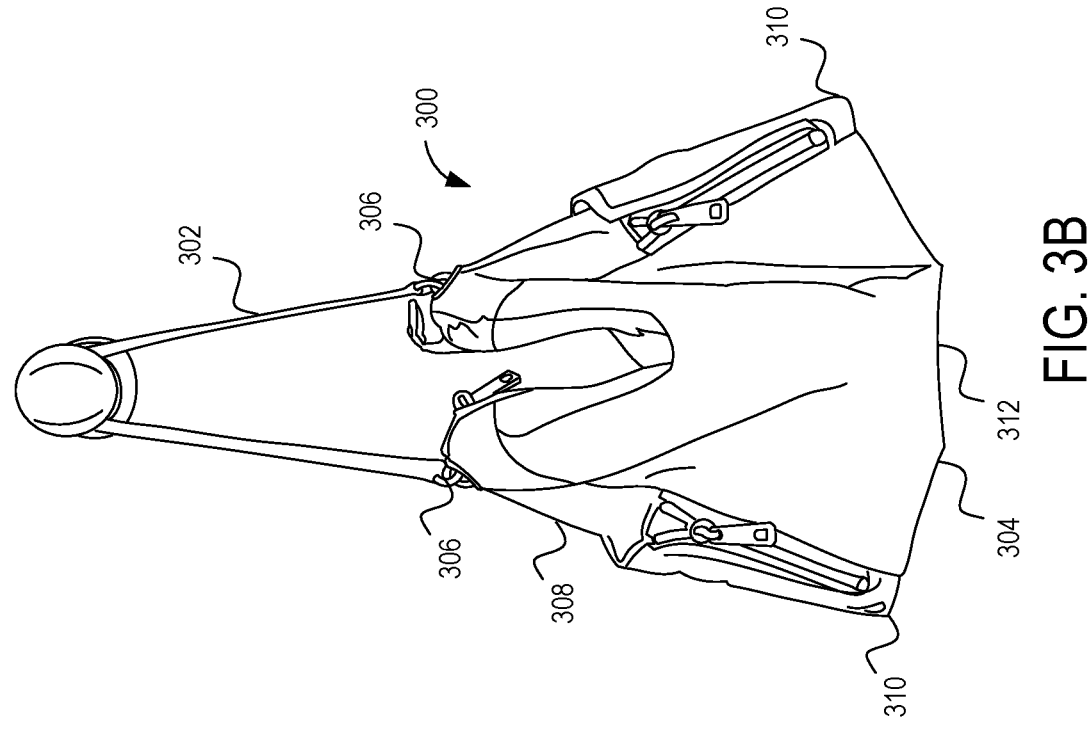
FIG. 3B is an example image of the test item with the weight load added.
Figure 3A:
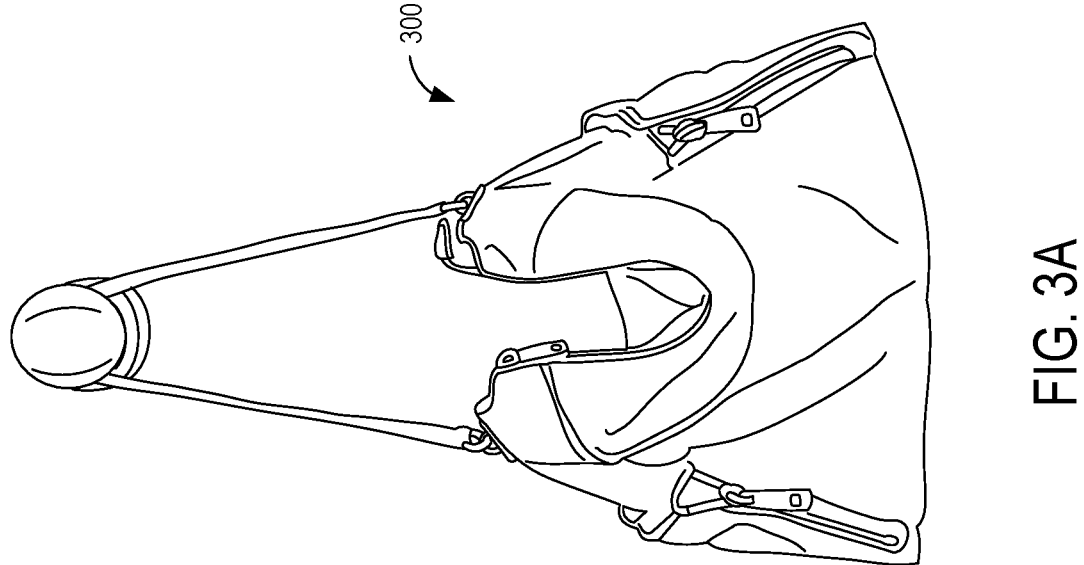
FIG. 3A is an example image of a test item without a weight load.

FIG. 3A is an example image of a test item without a weight load. Here the test item is a handbag 300, which is shown hanging from a standard doorknob. The handbag 300 has a natural deformation. This image is the first image provided to the image analyzer 204.

FIG. 3B is an example image of the test item with the weight load added to the handbag 300. The image of FIG. 3B is the second image provided to the image analyzer 204. With the added weight load added in a particular location, a handle 302 and bottom 304 of the handbag 300 deforms or changes shape in comparison to the first image.

In some cases, a user may take a photo before and after adding the weight load and provide the images to the image analyzer 204. In other cases, the images may have been uploaded to a data storage and accessed by the image analyzer 204. The image analyzer 204 takes the two images and performs a comparison to determine a deformation difference in the handle 302 and/or the bottom 304 of the handbag 300. For example, the deformation difference may be measured in millimeters at various locations along the handle 302 and the bottom 304. For instance, the locations can include locations 306 where the handle 302 is attached to a body 308 of the handbag 300 and a location where the top of the handle 302 is hanging off the doorknob (if visible). In some embodiments, additional locations that are a uniform distance between the top of the handle 302 and where the handle 302 is attached to the body 308 can be used (e.g., every 2 centimeters). Using more locations and deformation differences results in a more accurate result.

Similarly, locations on the bottom 304 of the handbag 300 can be used to determine the deformation differences. The locations can include corner locations 310 where the bottom 304 meets the body 308 and a center location 312 of the bottom 304 of the handbag 300. In some embodiments, additional locations that are a uniform distance between the corner locations 310 and the center location 312 can be used (e.g., every 2 centimeters). Using more locations and deformation differences results in a more accurate result.

Figure 4:
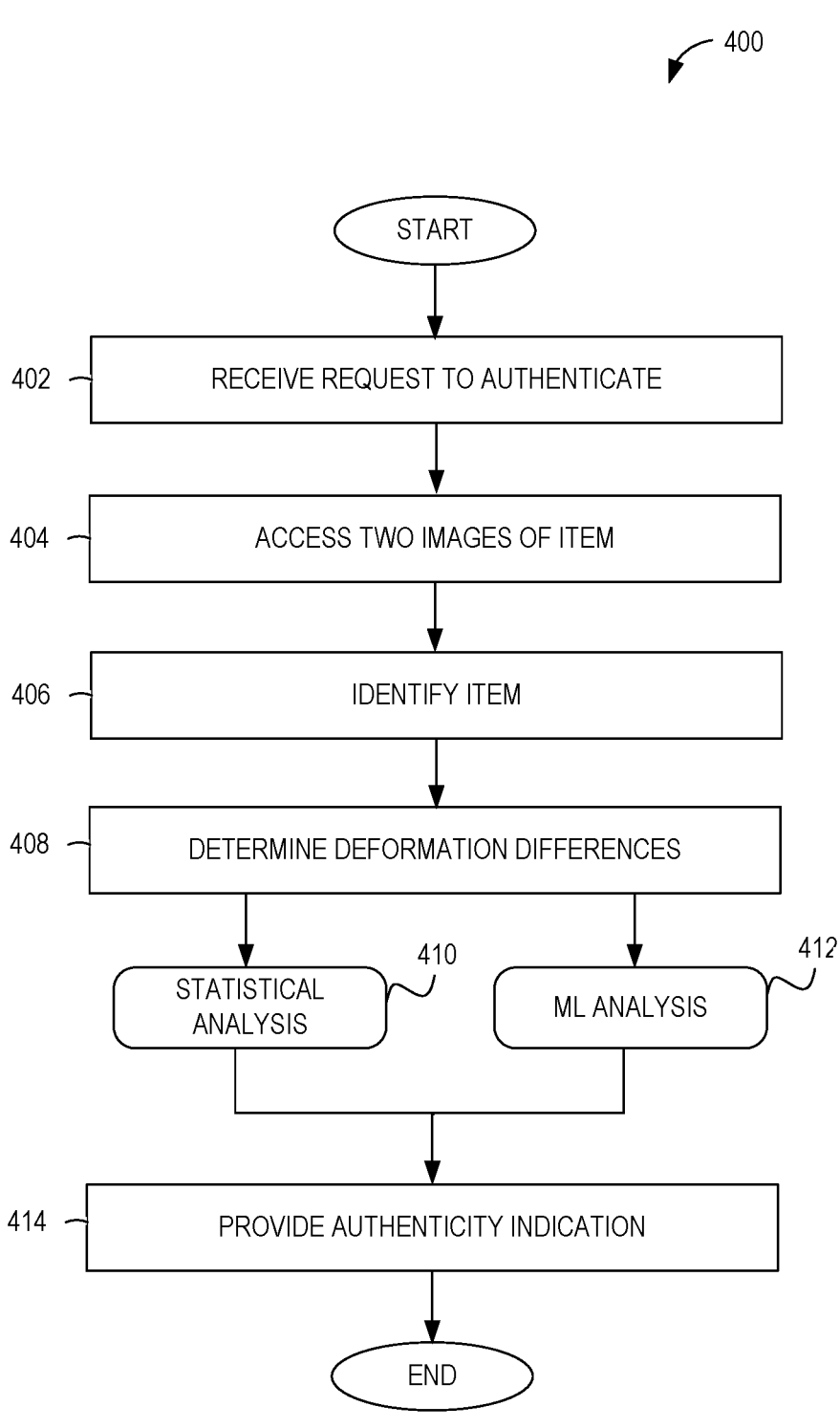
FIG. 4 is a flowchart illustrating operations of a method for authenticating an item, according to example embodiments.

FIG. 4 is a flowchart illustrating operations of an example method 400 for authenticating an item, according to example embodiments. Operations in the method 400 may be performed by the authentication system 116, using components described above with respect to FIG. 2. Accordingly, the method 400 is described by way of example with reference to the authentication system 116. However, it shall be appreciated that at least some of the operations of the method 400 may be deployed on various other hardware configurations or be performed by similar components residing elsewhere in the network environment 100. Therefore, the method 400 is not intended to be limited to the authentication system 116.

In operation 402, the authentication system 116 (e.g., the communication component 202) receives a request to authenticate an item. For ease of discussion, the item is a luxury handbag. In some cases, the request includes a first image of the handbag without a weight load and a second image of the handbag with the weight load. Additionally, the request can include one or more of a serial number of the handbag, a weight of the handbag, a year purchased or manufactured, or a brand/model of the handbag.

In operation 404, the image analyzer 204 accesses the two images of the item. In some cases, the image analyzer 204 receives the two images from the communication component 202. In other cases, the images may have been uploaded to the network system 102 (e.g., by the client device 106 or other device) and stored in the data storage 120 or the image data storage 206. In these cases, the image analyzer 204 accesses the two images from the data storage 120 or 206.

In operation 406, the image analyzer 204 identifies the item. In some cases, the image analyzer 204 extracts features from one of the images of the item to identify a brand and/or model of the item. The features can include, for example, a logo, pattern, color scheme, and/or shape that are distinct characteristics of a particular brand/model of the item. Thus, the image analyzer 204 can extract features such as, for example, a name (e.g., logo), size, shape (e.g., tote bag versus a bucket bag), patterns, and/or colors from one or both images. In some embodiments, the user may be asked to capture a photo of a tag located on the handbag or have their client device 106 read an RFID tag (e.g., Chanel bags have RFID chips since 2021). The image analyzer 204 then accesses the image data store 206 to identify the item based on the extracted features.

In other cases, the request to authenticate the item can include features that are used by the image analyzer 204 to identify the item. For example, the request can include a brand, model name, serial number, data of purchase or manufacture, and/or weight of the item. If needed, the image analyzer 204 can use these features to look up the item in the image data storage 206.

In operation 408, the image analyzer 204 determines deformation differences between the two images. In example embodiments, the image analyzer 204 compares the two images to determine differences in the deformation at various locations. For instance, the first image of the handbag shows the handle and bottom of the bag with a natural deformation, while the second image shows the handle and bottom of the bag strained based on the addition of the weighted item with a known shape and weight such as a standard can of soda. The image analyzer 204 selects various locations along the handle and/or the bottom of the handbag and determines the difference in deformation at these various locations. The deformation difference is a measurement of a change in the material of the item based on the additional of the weighted item and can be measure, for example, in millimeters, centimeters, or other standard unit of measurement. In further embodiments, a strain may be determined in various parts using strain formula=$\Delta x/x$.

In embodiments that use statistical analysis, the method 400 proceeds to operation 410 where statistical analysis is performed. The deformation differences determined by the image analyzer 204 at the various locations along the handle and/or the body along with identification/information regarding the item are provided to the statistical system 208. Operation 410 will be discussed in more detail in connection with FIG. 5 below.

In embodiments that use machine learning analysis, the method 400 proceeds to operation 412 where machine learning analysis is performed. The deformation differences determined by the image analyzer 204 at the various locations along the handle and/or body along with identification/information regarding the item are provided to the machine learning system 210. Operation 412 will be discussed in more detail in connection with FIG. 6 below.

In operation 414, an indication of the authenticity of the item is provided. In some cases, the indication is displayed on a user interface of the client device 106 via the client application 108. In other cases, an electronic communication (e.g., email, text message) is generated and sent to the client device 106. In cases where an item being authenticated is listed for sale with the network system 102, a badge indicating the authenticity of the item can be graphically included in a display of the listing for the item.

Figure 5:
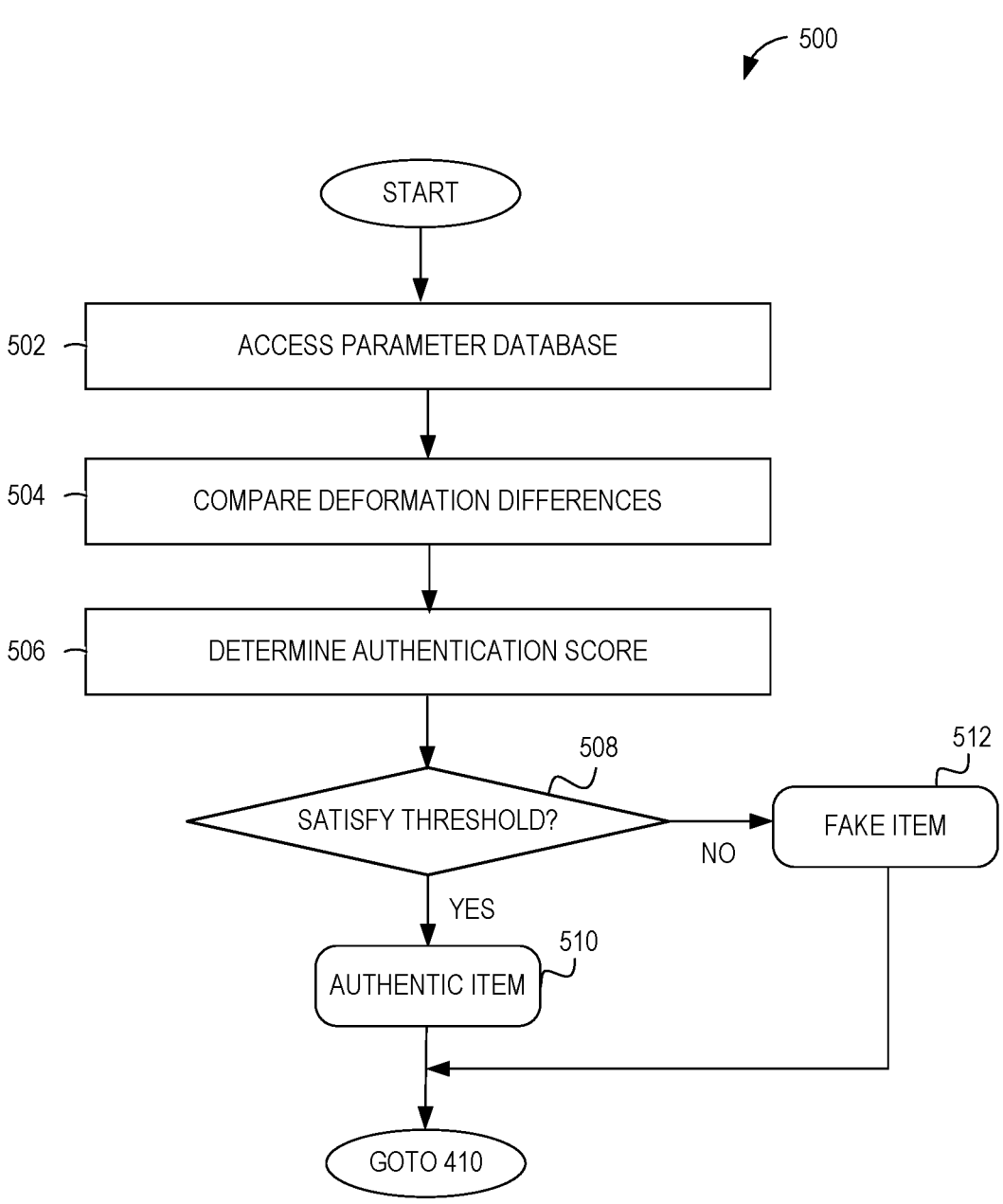
FIG. 5 is a flowchart illustrating operations of a method for performing statistical deformation analysis, according to example embodiments.

FIG. 5 is a flowchart illustrating operations of a method 500 (e.g., operations 410) for statistical deformation analysis, according to example embodiments. Operations in the method 500 may be performed by the authentication system 116, using components described above with respect to FIG. 2. Accordingly, the method 500 is described by way of example with reference to the authentication system 116. However, it shall be appreciated that at least some of the operations of the method 500 may be deployed on various other hardware configurations or be performed by similar components residing elsewhere in the network environment 100. Therefore, the method 500 is not intended to be limited to the authentication system 116.

In operation 502, the comparison component 212 accesses a database of known deformation parameters for the authentic version of the item from the parameter data storage 214. The comparison component 212 uses the identification/information associated with the item to identify the item (e.g., brand and model) and accesses the corresponding deformation parameters for the authentic version of the item. In some cases, the parameter data storage 214 includes different deformation differences for a same brand/model for different years. As such, the information associated with the item can include a year of purchase or manufacture of the item. Further still, the information associated with the item can include a weight of the item.

In operation 504, the comparison component 212 compares the deformation differences from the images of the item to deformation differences accessed from the parameter data storage 214. For instance, the comparison component 212 compares the deformation differences at the various locations along the handle and/or the bottom of the handbag with a database of known deformation parameters for the authentic version of the handbag. In performing the comparison, the comparison component 212 may determine whether each of the deformation differences is within a threshold of the corresponding value in the database.

In operation 506, the threshold component 216 determines an authentication score based on the comparison. The authentication score can comprise a percentage of the locations where the deformation difference of the item are within a comparison threshold (e.g., 75%) of the corresponding value in the parameter data storage 214. For example, if nine out of ten locations are within a threshold of the corresponding value in the parameter data storage, 214, the authentication score is 0.9 or 90%.

In operation 508, a determination is made whether the authentication score satisfies (e.g., meets or transgresses) the authenticity threshold. For example, if the deformation difference at 90% (e.g., an authentication threshold of 90% or 0.9) of the locations is within the threshold of the corresponding value in the database, the threshold component 216 labels the test item authentic in operation 510. If the authentication score does not satisfy the authenticity threshold, then the item is labeled a fake item in operation 512.

In some cases, the authenticity threshold is the same for all types of items for a particular brand or category. In other cases, the authenticity threshold is different based on the brand, model, and/or category. The authenticity threshold can be a default threshold, be configurable by an operator of the authentication system 116, or be machine-learned. For example, the training of the machine learning models can include training one or more models to determine the authenticity threshold.

Figure 6:
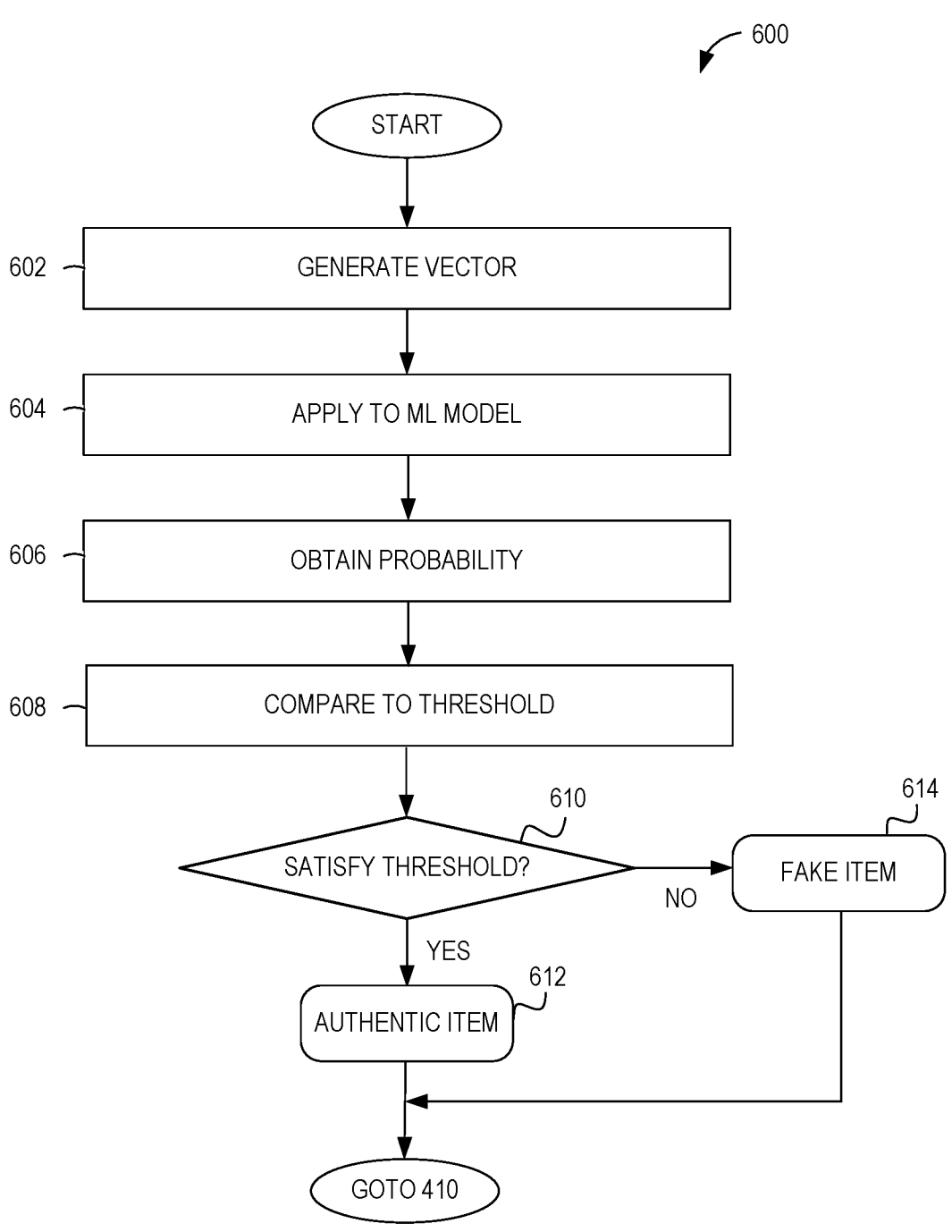
FIG. 6 is a flowchart illustrating operations of a method for performing machine-learning deformation analysis, according to example embodiments.

FIG. 6 is a flowchart illustrating operations of a method 600 (e.g., operations 412) for performing machine-learning deformation analysis, according to example embodiments. Operations in the method 600 may be performed by the authentication system 116, using components described above with respect to FIG. 2. Accordingly, the method 600 is described by way of example with reference to the authentication system 116. However, it shall be appreciated that at least some of the operations of the method 600 may be deployed on various other hardware configurations or be performed by similar components residing elsewhere in the network environment 100. Therefore, the method 600 is not intended to be limited to the authentication system 116.

In operation 602, the deformation differences and any additional information is formatted into an input vector. The formatting may be performed by the evaluation component 220 or the image analyzer 204. The additional information can include, for example, a year (e.g., manufactured, purchased) or weight associated with the item.

In operation 604, the input vector is applied to a corresponding machine learning model by the evaluation component 220. In some cases, a separate machine learning model is trained for each brand and model of authentic items and, in some cases, based on type of material used for that brand and model. Alternatively, the machine learning models may be trained for a particular brand (e.g., Louis Vuitton, Gucci, Prada) or category of item (e.g., luxury tote bags, luxury bucket bag). Thus, the identification of the item is used to access the corresponding machine learning model.

In operation 606, an authentication score or probability is obtained from the machine learning model. The authentication score is then compared to an authenticity threshold in operation 608 by the threshold component 222. In some cases, the authenticity threshold is the same for all types of items for a particular brand or category. In other cases, the authenticity threshold is different based on the brand, model, and/or category. For example, the authenticity threshold may be a probability of 0.8 or 80% for luxury tote bags. The authenticity threshold can be a default threshold, be configurable by an operator of the authentication system 116, or be machine-learned.

In operation 610, a determination is made by the threshold component 222 whether the authentication score satisfies (e.g., meets or transgresses) the authenticity threshold. For example, an authentication probability of 0.79 outputted by the evaluation component 220 would not satisfy a 0.8 authenticity threshold. If the authentication score or probability does satisfy the authenticity threshold, the threshold component 222 labels the item authentic in operation 612. If the authentication score or probability does not satisfy the authenticity threshold, then the item is labeled a fake item in operation 614.

In some cases, there are different levels of authentication available for authenticating a handbag. A first level of authentication is based solely on the deformation differences of the handle of the handbag. Alternatively, the first level of authentication can be based solely on the deformation differences of the bottom of the handbag. A second level of authentication can be based on the deformation differences of both the handle and the bottom of the handbag. The second level of authentication can detect, for example, that the handle of the handbag is fake, but the body of the handbag is real (or vice-versa). Weight comparison can be included as part of the first or second level authentication level.

While examples discuss authenticating a handbag based on deformation differences of the handle and/or the bottom of the handbag, alternative embodiments may consider deformation differences in other portions of the handbag. For example, the body of the handbag may be considered and different locations on the body used to determine deformation differences. In another example, deformation of a surface feature (e.g., a zipper, an outside pocket) of the handbag can be considered.

Furthermore, while examples discuss authenticating handbags, other types of luxury goods can be authenticated using similar methods. For example, wallets or pouches can be authenticated using a smaller known weighted item (e.g., D cell battery).

As a further example, designer scarves can be authenticated. Real wool will elongate and deform a certain amount while synthetic material may have little to no deformation depending on the material used. Thus, images of a scarf (e.g., hanging from all four corners with a known weighted item added) can be used to determine deformation differences. These deformation differences can then be compared with data for an authentic version of the scarf either through statistical analysis or machine learning analysis.

Figure 7:
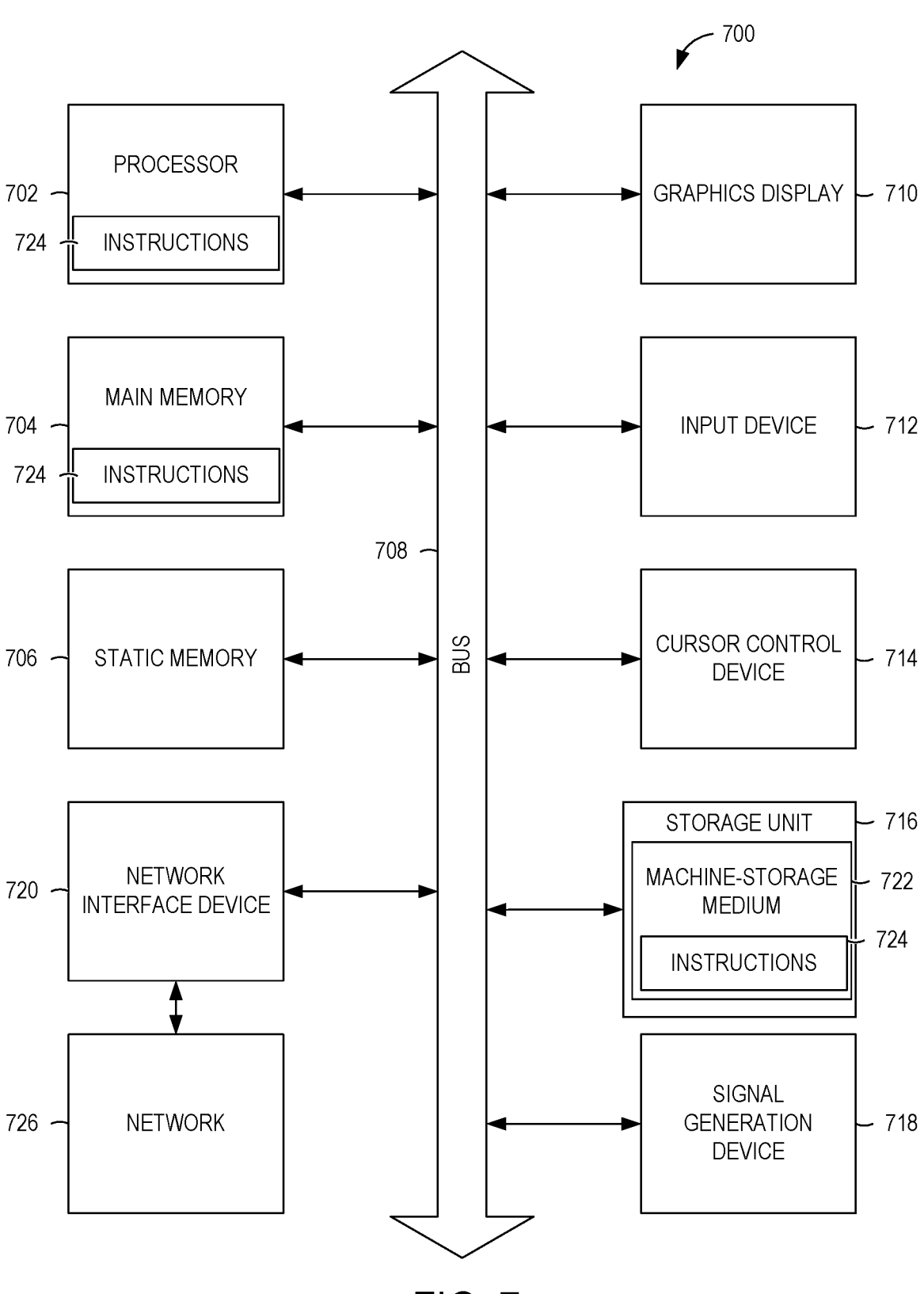
FIG. 7 is a block diagram illustrating components of a machine, according to some examples, able to read instructions from a machine-storage medium and perform any one or more of the methodologies discussed herein.

FIG. 7 illustrates components of a machine 700, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIG. 4 to FIG. 6. In one embodiment, the instructions 724 can transform the machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more components described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 (e.g., a tangible machine-storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-storage media (e.g., tangible and non-transitory machine-storage media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented components may be located in a single geographic location (e.g., within a home environment, an office environment, or a server farm). In other example embodiments, the one or more processors or processor-implemented components may be distributed across a number of geographic locations.

EXAMPLES

Example 1 is a method for authenticating items using deformation analysis. The method comprises receiving a request to authenticate an item; accessing two images of the item, a first image showing the item hanging without a weight load and a second image showing the item hanging with the weight load; analyzing, by an image analyzer, the two images to determine deformation differences of the item between the two images; determining an authentication score for the item by applying the deformation differences to a machine learning model trained with training data derived from authentic and counterfeit items; determining whether the authentication score transgresses an authenticity threshold; and based on the authentication score transgressing the authenticity threshold, causing presentation of an indication of authenticity of the item.

In example 2, the subject matter of example 1 can optionally include wherein applying the deformation differences to the machine learning model comprises applying a vector of deformation differences between the two images to the machine learning model.

In example 3, the subject matter of any of examples 1-2 can optionally include training the machine learning model using the training data derived from the authentic and counterfeit items, the training data including deformation differences at various locations of the authentic and counterfeit items.

In example 4, the subject matter of any of examples 1-3 can optionally include wherein training the machine learning model includes training on a year or weight for each of the authentic items; and the authentication probability is based in part on a year or weight of the item.

In example 5, the subject matter of any of examples 1-4 can optionally include wherein the various locations comprise different locations on a handle of a handbag or a bottom of a handbag.

In example 6, the subject matter of any of examples 1-5 can optionally include identifying a brand and model of the item by analyzing at least one of the images of the item or based on a serial number of the item.

In example 7, the subject matter of any of examples 1-6 can optionally include wherein determining the authentication score further comprises identifying a time when the item was created or purchased; and using the time as an additional feature to determine the authentication score.

In example 8, the subject matter of any of examples 1-7 can optionally include wherein the two images are received from a client application running on a mobile device with camera capabilities for capturing the two images.

In example 9, the subject matter of any of examples 1-8 can optionally include wherein the item is a handbag and the deformation differences comprise differences in a shape of a handle or a shape of a body of the handbag.

In example 10, the subject matter of any of examples 1-9 can optionally include wherein causing presentation of the indication of authenticity comprises graphically displaying an authenticity badge on a listing for the item.

Example 11 is a system for authenticating items using deformation analysis. The system comprises one or more processors and a memory storing instructions that, when executed by the one or more processors, cause the one or more processors to perform operations comprising receiving a request to authenticate an item; accessing two images of the item, a first image showing the item hanging without a weight load and a second image showing the item hanging with the weight load; analyzing, by an image analyzer, the two images to determine deformation differences of the item between the two images; determining an authentication score for the item by applying the deformation differences to a machine learning model trained with training data derived from authentic and counterfeit items; determining whether the authentication score transgresses an authenticity threshold; and based on the authentication score transgressing the authenticity threshold, causing presentation of an indication of authenticity of the item.

In example 12, the subject matter of example 11 can optionally include wherein applying the deformation differences to the machine learning model comprises applying a vector of deformation differences between the two images to the machine learning model.

In example 13, the subject matter of any of examples 11-12 can optionally include wherein the operations further comprise training the machine learning model using the training data derived from the authentic and counterfeit items, the training data including deformation differences at various locations of the authentic and counterfeit items.

In example 14, the subject matter of any of examples 11-13 can optionally include wherein training the machine learning model includes training on a year or weight for each of the authentic items; and the authentication probability is based in part on a year or weight of the item.

In example 15, the subject matter of any of examples 11-14 can optionally include wherein the various locations comprise different locations on a handle of a handbag or a bottom of a handbag.

In example 16, the subject matter of any of examples 11-15 can optionally include wherein the operations further comprise identifying a brand and model of the item by analyzing at least one of the images of the item or based on a serial number of the item.

In example 17, the subject matter of any of examples 11-16 can optionally include wherein determining the authentication score further comprises identifying a time when the item was created or purchased; and using the time as an additional feature to determine the authentication score.

In example 18, the subject matter of any of examples 11-17 can optionally include wherein the two images are received from a client application running on a mobile device with camera capabilities for capturing the two images.

In example 19, the subject matter of any of examples 11-18 can optionally include wherein the item is a handbag and the deformation differences comprise differences in a shape of a handle or a shape of a body of the handbag.

Example 20 is a computer-storage medium comprising instructions which, when executed by one or more processors of a machine, cause the machine to perform operations for authenticating items using deformation analysis. The operations comprise receiving a request to authenticate an item; accessing two images of the item, a first image showing the item hanging without a weight load and a second image showing the item hanging with the weight load; analyzing, by an image analyzer, the two images to determine deformation differences of the item between the two images; determining an authentication score for the item by applying the deformation differences to a machine learning model trained with training data derived from authentic and counterfeit items; determining whether the authentication score transgresses an authenticity threshold; and based on the authentication score transgressing the authenticity threshold, causing presentation of an indication of authenticity of the item.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method comprising:
    receiving a request to authenticate an item;
    accessing two images of the item, a first image showing the item hanging without a weight load and a second image showing the item hanging with the weight load;
    analyzing, by an image analyzer, the two images to determine deformation differences of the item between the two images;
    determining an authentication score for the item by applying the deformation differences to a machine learning model trained with training data derived from authentic and counterfeit items;
    determining whether the authentication score transgresses an authenticity threshold; and
    based on the authentication score transgressing the authenticity threshold, causing presentation of an indication of authenticity of the item.

2. The method of claim 1, wherein applying the deformation differences to the machine learning model comprises applying a vector of deformation differences between the two images to the machine learning model.

3. The method of claim 1, further comprising:
    training the machine learning model using the training data derived from the authentic and counterfeit items, the training data including deformation differences at various locations of the authentic and counterfeit items.

4. The method of claim 3, wherein:
    training the machine learning model includes training on a year or weight for each of the authentic items; and
    the authentication probability is based in part on a year or weight of the item.

5. The method of claim 3, wherein the various locations comprise different locations on a handle of a handbag or a bottom of a handbag.

6. The method of claim 1, further comprising:
    identifying a brand and model of the item by analyzing at least one of the images of the item or based on a serial number of the item.

7. The method of claim 1, wherein determining the authentication score further comprises:
    identifying a time when the item was created or purchased; and
    using the time as an additional feature to determine the authentication score.

8. The method of claim 1, wherein the two images are received from a client application running on a mobile device with camera capabilities for capturing the two images.

9. The method of claim 1, wherein the item is a handbag and the deformation differences comprise differences in a shape of a handle or a shape of a body of the handbag.

10. The method of claim 1, wherein causing presentation of the indication of authenticity comprises graphically displaying an authenticity badge on a listing for the item.

11. A system comprising:

one or more processors; and a memory storing instructions that, when executed by the one or more processors, cause the one or more processors to perform operations comprising:

receiving a request to authenticate an item;

accessing two images of the item, a first image showing the item hanging without a weight load and a second image showing the item hanging with the weight load;

analyzing, by an image analyzer, the two images to determine deformation differences of the item between the two images;

determining an authentication score for the item by applying the deformation differences to a machine learning model trained with training data derived from authentic and counterfeit items;

determining whether the authentication score transgresses an authenticity threshold; and based on the authentication score transgressing the authenticity threshold, causing presentation of an indication of authenticity of the item.

12. The system of claim 11, wherein applying the deformation differences to the machine learning model comprises applying a vector of deformation differences between the two images to the machine learning model.

13. The system of claim 11, wherein the operations further comprise:

training the machine learning model using the training data derived from the authentic and counterfeit items, the training data including deformation differences at various locations of the authentic and counterfeit items.

14. The system of claim 13, wherein:

training the machine learning model includes training on a year or weight for each of the authentic items; and the authentication probability is based in part on a year or weight of the item.

15. The system of claim 13, wherein the various locations comprise different locations on a handle of a handbag or a bottom of a handbag.

16. The system of claim 11, wherein the operations further comprise:

identifying a brand and model of the item by analyzing at least one of the images of the item or based on a serial number of the item.

17. The system of claim 11, wherein determining the authentication score further comprises:

identifying a time when the item was created or purchased; and using the time as an additional feature to determine the authentication score.

18. The system of claim 11, wherein the two images are received from a client application running on a mobile device with camera capabilities for capturing the two images.

19. The system of claim 11, wherein the item is a handbag and the deformation differences comprise differences in a shape of a handle or a shape of a body of the handbag.

20. A machine-storage medium comprising instructions which, when executed by one or more processors of a machine, cause the machine to perform operations comprising:

receiving a request to authenticate an item;

accessing two images of the item, a first image showing the item hanging without a weight load and a second image showing the item hanging with the weight load;

analyzing, by an image analyzer, the two images to determine deformation differences of the item between the two images;

determining an authentication score for the item by applying the deformation differences to a machine learning model trained with training data derived from authentic and counterfeit items;

determining whether the authentication score transgresses an authenticity threshold; and based on the authentication score transgressing the authenticity threshold, causing presentation of an indication of authenticity of the item.

\* \* \* \* \*